(12) United States Patent
Tseng et al.

(10) Patent No.: US 6,452,543 B1
(45) Date of Patent: Sep. 17, 2002

(54) GPS PATCH ANTENNA ATTITUDE REFERENCE METHOD

(75) Inventors: Gan-Tai Tseng, Rancho Palos Verdes; Jo-Lien Yang, Palos Verdes Estates, both of CA (US); Steven Lloyd Johns, Leesburg, VA (US); Cheng A. Wu, Woodland Hills, CA (US)

(73) Assignee: Aerospace Corporation, El Segundo, CA (US)

( * ) Notice: Subject to any disclaimer, the term of this patent is extended or adjusted under 35 U.S.C. 154(b) by 18 days.

(21) Appl. No.: 09/866,044

(22) Filed: May 24, 2001

(51) Int. Cl.$^7$ .................................................. G01S 5/14
(52) U.S. Cl. .................... 342/357.11; 342/427
(58) Field of Search ............................. 342/357.11, 355, 342/424, 427; 701/213, 13

(56) References Cited

U.S. PATENT DOCUMENTS 6,018,315 A * 1/2000 Ince et al. ............. 342/357.11
6,128,557 A * 10/2000 Fenton et al. .................. 701/13

* cited by examiner

Primary Examiner—Gregory C. Issing

(57) ABSTRACT

A null slit antenna pattern receives GPS signals from at least three GPS satellites functioning as pseudo stars for spin rate and spin axis attitude determination of a spinning space vehicle in an earth orbit below the GPS satellites.

14 Claims, 3 Drawing Sheets

SPIN AXIS GEOMETRY

DUAL PATCH ANTENNA DIFFERENCE PATTERN

SENSOR SYSTEM

SPIN AXIS GEOMETRY

SPIN AXIS DETERMINATION PROCESS

GPS PATCH ANTENNA ATTITUDE REFERENCE METHOD

REFERENCE TO RELATED APPLICATION

The present application is related to applicant's copending application entitled GPS Patch Antenna Attitude Reference System Ser. No. 09/866,045, filed May 24, 2001, by the same inventors.

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of attitude determination of space vehicle. More particularly, the invention relates to the use of a patch antenna for attitude determination of a spinning space vehicle.

BACKGROUND OF THE INVENTION

The spin axis attitude determination of a spinning space vehicle has been traditionally accomplished by using a combination of sun and earth horizon sensors. A sun sensor measures the sun illumination spike and the elevation angle with respect to the spin axis of the space vehicle. Sun position and elevation information establishes a geometric sun position cone with a half cone angle equal to the elevation angle on which the spin axis lies. A similar earth elevation cone can be constructed based on the earth sensor measurements. The intersection of the sun position cone and earth elevation cone provide the inertial attitude information for determining the spin axis of the rotating vehicle. The cost of such a system can be appreciable. It is desirable to find cost effective alternatives to the use of expensive sun and horizon sensors.

U.S. Pat. No. 4,414,550 issued Nov. 8, 1983 discloses one-quarter wave plate patch antennas. U.S Pat. No. 5,450,090 discloses an elongated microstrip antenna. These patch and strip antennas are inexpensive to manufacture. A one-quarter wave plate patch antennas can be used for receiving transmitted RF signals. U.S. Pat. No. 4,962,383 issued Oct. 9, 1990 discloses an array antenna system using a plurality of ¼ wave plate that couples a phase response from one patch antenna to another patch antenna as a pair for use as an element in an array antenna. The two patch antennas can radiate microwave signals in a forward and reverse direction with beam control. The antenna patterns of the two patch antenna are combined to form a single antenna beam. These patch antennas provide hemispherical antenna patterns that are used to receive incoming signals over a wide angular range. These patch antennas do not provide an ability for attitude determination of a spinning spacecraft.

Attitude determination of a space vehicle using GPS signals can be based on an interferrometry of a spatially separated multiple patch antenna configuration. Using the relative phase differential between two selected patches, an angular error with respect to an axis perpendicular to the line joining the two patches can be determined. However, the angular error is with respect to a stationary axis unsuitable for attitude determination of a rotating system. While patch antennas have been used for attitude determination of a stationary spin axis space vehicle, such patch antenna have not been used for attitude control in a rotating space vehicle. These and other disadvantages are solved or reduced using the invention.

SUMMARY OF THE INVENTION

An object of the invention is to provide a system and method for attitude determination in a rotating space vehicle.

Another object of the invention is to provide system and method for attitude determination of a rotating space vehicle using an antenna pattern having a null slit.

Yet another object of the invention is to provide system and method for attitude determination of a rotating space vehicle using a pair of patch antennas for forming an antenna pattern having a null slit.

Still another object of the invention is to provide system and method for spin axis attitude determination of a rotating space vehicle using a pair of patch antenna for forming an antenna pattern having a null slit for time referencing received GPS signals from GPS satellites.

Still another object of the invention is to provide system and method for determining the spin axis attitude of a rotating space vehicle using a pair of patch antenna for forming an antenna pattern having a null slit for receiving GPS signals from GPS satellites functioning as pseudo star references.

The invention is directed to the creation and use of an electronic nulling slit antenna pattern for determining the spin axis attitude of a spinning space vehicle. A preferred sensor system includes a GPS receiver, a conventional sum and difference hybrid, and two juxtaposed ¼ wave patch antennas. The two ¼ wave patch antennas are placed side by side, separated by an optimum distance, on a lateral surface of a rotating space vehicle. The side by side placement causes an overlapping of the two antenna patterns each of which having a hemispherical pattern having a peak gain at nearly the center position. A conventional hybrid is used to create sum and difference signals from the two patch antennas. The difference signal is created by the hybrid introducing a 180 degree phase shift between the two patches signal creating an electronic null slit, that is, a null in the difference antenna pattern along the plane of symmetry between the patch antennas. This plane of symmetry is referred to as the center plane position. The sum signal provides a peak gain at the center plane position between the antennas. The sum signal is used for conventional GPS signal detection and reception and for computing a navigation solution of the spinning space vehicle. The difference signal is used as a time reference among a plurality of received GPS signals for determining the spin rate of the spinning space vehicle. The time reference is then also used to determine azimuth angles for the GPS satellites for computing the spin axis attitude of the spinning vehicle.

The system and method use visible GPS satellites as pseudo stars. The sum and difference GPS signals are recorded when the signal to noise ratio exceeds a predetermined threshold indicating the presence of a GPS signal and hence the presence of a GPS satellite in the field of view of the patch antennas. The null slit pattern of the GPS difference signals is used for time correlation of all of the received GPS signals. The null slit is used to reference the received GPS signals to precise times when the GPS signals enter a narrow field of view of the null slit of the patch antenna difference pattern. The split dual patch antenna serves to track the GPS signals from all of the visible GPS satellites. Each of GPS sum and difference signals are recorded with time stamps for time cross-referencing and time correlation among all of the GPS sum and difference signals. The system and method are then used to determine the spin rate and spin axis attitude of the rotating vehicle from the

DETAILED DESCRIPTION OF THE PREFERRED EMBODIMENT

Figure 1:
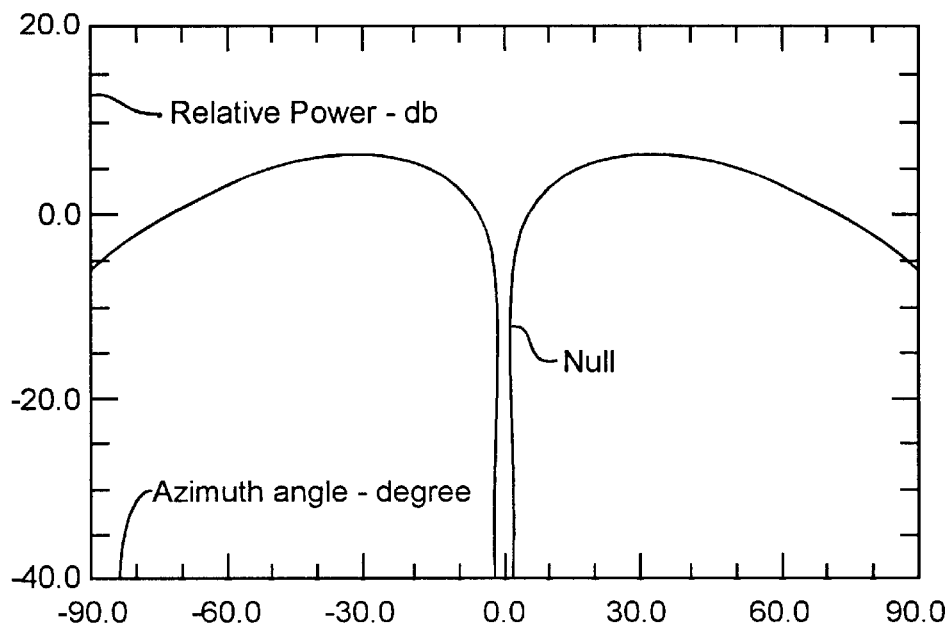
FIG. 1 is a plot of a dual patch antenna difference pattern.
Figure 2:
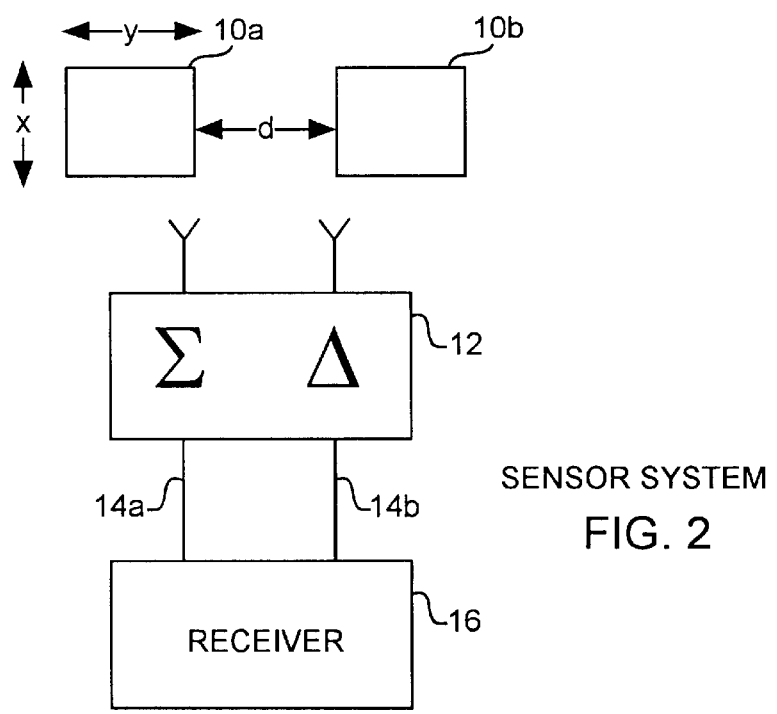
FIG. 2 is a block diagram of a sensor system.

An embodiment of the invention is described with reference to the figures using reference designations as shown in the figures. Referring to FIGS. 1 and 2, a pair of patch antennas 10a and 10b in a sensor system are used to form dual patch antenna sum and difference patterns using a conventional sum and difference antenna hybrid 12 communicating a sum signal 14a and a difference signal 14b to a receiver 16. The pair of patch antennas 10a and 10b each create a hemispherical antenna pattern. With the two patch antennas placed nearly side by side, the two hemispherical antenna patterns are combined using the hybrid 12. A null slit pattern is created by placing two antenna elements side by side with the hemispherical patterns overlapping so that when subtracted from each other using the hybrid 12, the hemispherical pattern of one patch antenna is shifted out of phase and then added to the other hemispherical pattern of the other patch antenna producing a narrow null slit at the center plane position of the difference pattern. The azimuth angle of the difference pattern is aligned to a peak of a sum pattern and both patterns are orthogonally aligned to and extend from the patch antennas 10a and 10b. The null slit is created in the difference pattern to provide a time reference to the sum GPS signals. The sum beam pattern is created from the sum of the two hemispherical patterns of the two patch antennas. The sum pattern is used to detect the presence of GPS satellites transmitting GPS radio frequencies (RF) signals as the difference null slit pattern is used as a time reference. The beamwidth of the sum and difference patterns depend on the placement and pattern shape of the two patch antennas. Both of the sum and the null slit difference antenna patterns created by the hybrid 12 and patch antennas 10a and 10b are used to receive GPS signals at RF.

At GPS RF frequencies, a practical choice of patch antenna is the quarter wave patch antenna. The patch antenna could be preferably made of a four square inch conductive plate disposed over a dielectric disposed over a ground plate for providing reception of GPS signals having a wavelength of about eight inches. The size of the conducting plate and the dielectric constant are chosen to form the ¼ wave patch antenna. The ¼ wave patch antenna has a hemispherical antenna pattern for acquisition of the GPS RF signals. The two ¼ wave patch antennas then provide signals to the hybrid for generating the sum and difference patterns. The difference pattern provides the null slit for time correlation to the sum signals. Those skilled in the art can use simulation programs for predicting the patch antenna sum and difference patterns on a conductive cylindrical surface of a spinning vehicle. A first-order simulation program can be based on modeling each circularly polarized patch antenna by four slots on an infinite cylinder. The fields radiated by the slots are expanded in cylindrical modes and spatially combined to form an arrayed antenna pattern. The ideal slit null pattern has a rectangular notch shape across all elevation angles. While larger spacing between the antennas is better for producing a slit null and negating mutual coupling, smaller spacing is needed to eliminate grating lobes. A very small radius of curvature of the spinning satellite, such as a microsatellite, produces an exaggerated slit null. On a very large radius of large spinning satellites, such as those associated with a large launch vehicle, the curvature is modeled as an approximately flat surface. Those skilled in the art are capable of designing antenna sum and difference patterns respectively having a suitable sum beam and difference null slit.

Figure 3:
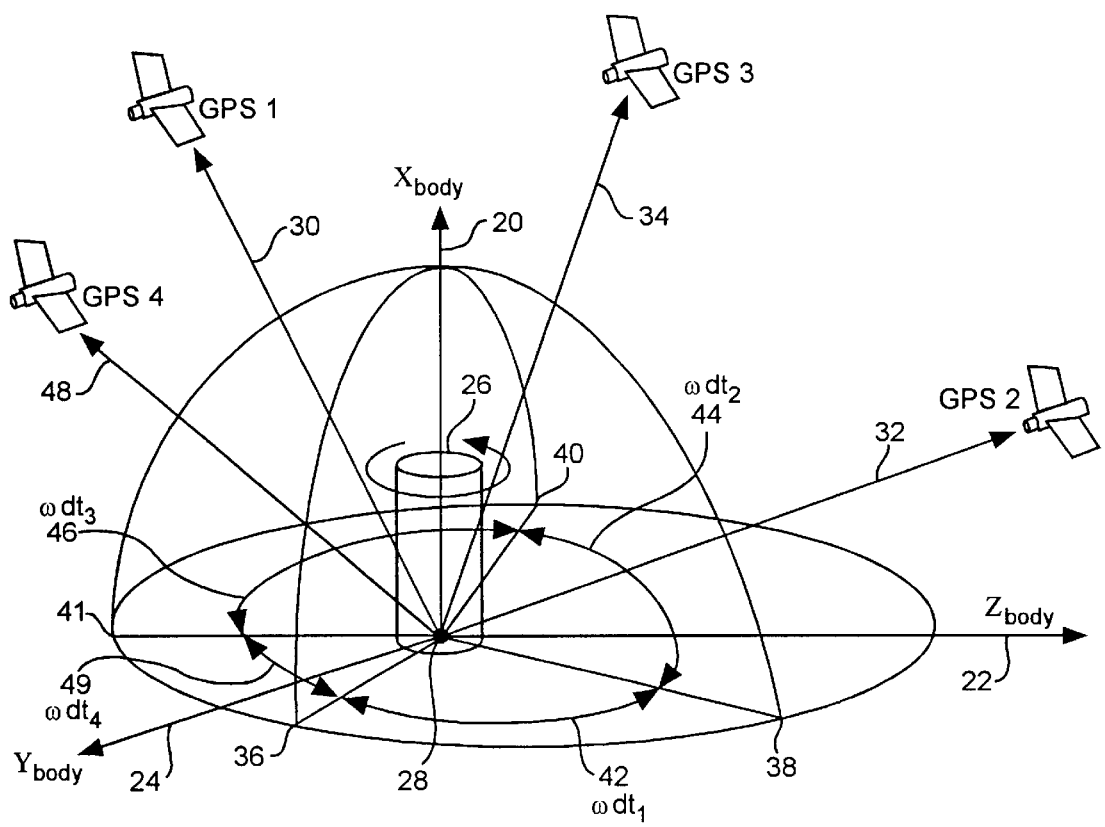
FIG. 3 is a diagram of a spin axis geometry.

Referring to FIGS. 1 through 3, and more particularly to FIG. 3, spin axis geometry of a rotating cylindrical vehicle 26 is relative to a three dimensional space defined by the X body axis 20, a Z body axis 22 and a Y body axis 24. The spin axis of the vehicle 26 is the X body axis extending longitudinally through the center of the cylindrical vehicle 26. A first GPS satellite GPS1 has a first line of sight 30 to a center point 28 at an approximate position of the antennae 10a and 10b. A second GPS satellite GPS2 has a second line of sight 32 to the center point 28. A third GPS satellite GPS3 has a third line of sight 34 to the center point 28. A fourth GPS satellite GPS4 has a fourth line of sight 48 to the center point 28. The first line of sight 30 defines a first plane in the spin axis geometry extending from center point 28 to the first satellite GPS1 along the first line of sight 30. The first plane intersects with the yz-body plane to define a first yz-projection line 36 extending from the center point 28. The second line of sight 32 defines a second plane in the spin axis geometry extending from center point 28 to the second satellite GPS2 along the second line of sight 32. The second plane intersects with the yz-body plane to form a second yz-projection line 38 extending from the center point 28. The third line of sight 34 defines a third plane in the spin axis geometry extending from center point 28 to the third satellite GPS3 along the third line of sight 34. The third plane intersects with the yz-body plane to form the third yz-projection line 40 extending from the center point 28. The fourth line of sight 48 defines a fourth plane in the spin axis geometry extending from center point 28 to the fourth satellite GPS4 along the fourth line of sight 48. The fourth plane intersects with the yz-body plane to form the fourth yz-projection line 41 extending from the center point 28. The first line of sight 30 has a first delta azimuth angle $\omega dt1$ 42 about the spin axis 20 to the second line of sight 32 between the first projection line 36 and the second projection line 38. The second line of sight 32 has a second delta azimuth angle $\omega dt2$ 44 about the spin axis 20 to the third line of sight 34 between the second projection line 38 and the third projection line 40. The third line of sight 34 has a third delta azimuth angle $\omega dt3$ 42 about the spin axis 20 to the fourth line of sight 48 between the third projection line 40 and the fourth projection line 41. The fourth line of sight 48 has a fourth delta azimuth angle $\omega dt4$ 49 about the spin axis 20 to the first line of sight 30 between the fourth projection line 41 and the first projection line 36. The spin axis geometry is described for four GPS satellites, but only three GPS satellites need be used for spin axis attitude determination. GPS signals from the fourth GPS satellite are preferably used for ambiguity resolution.

Figure 4:
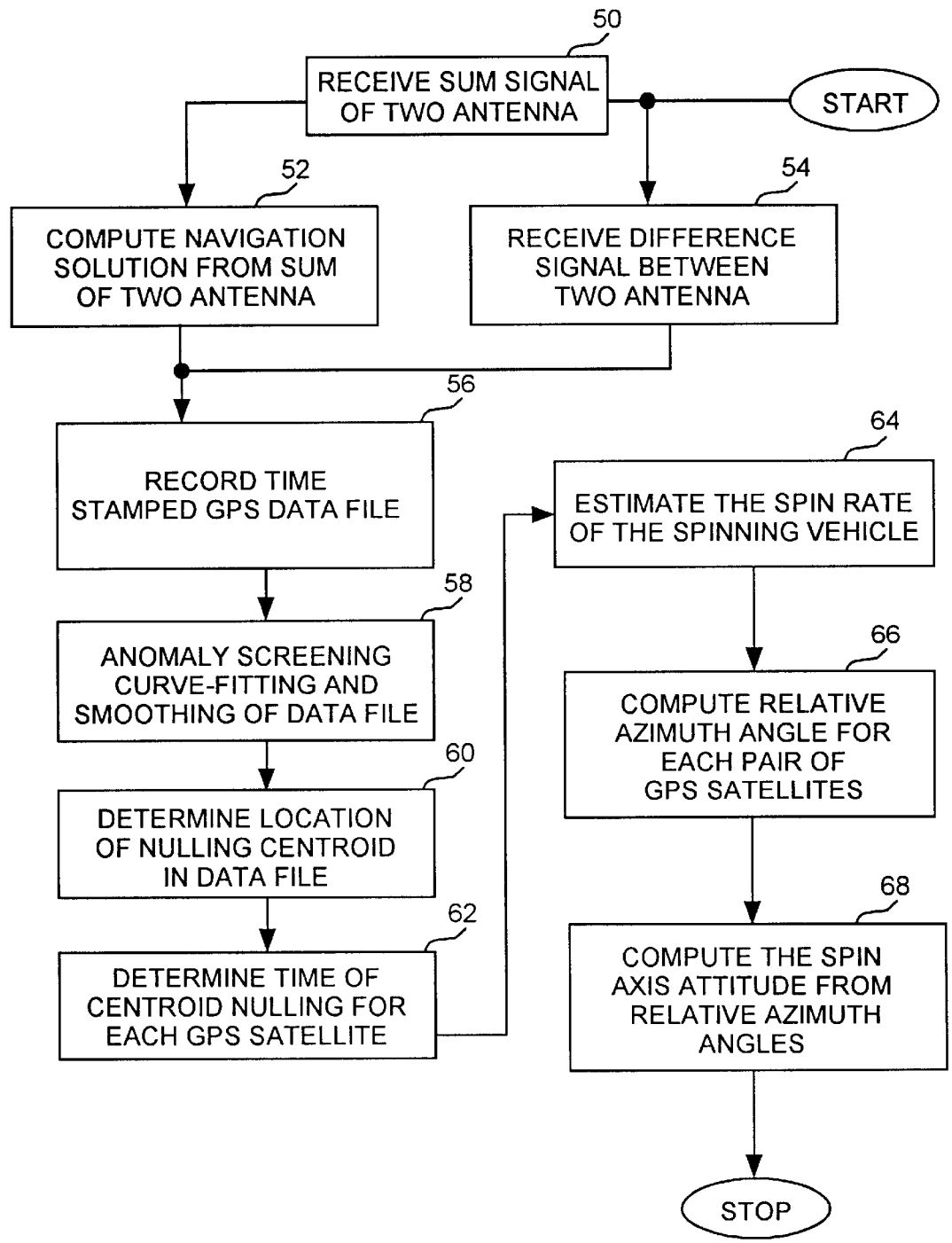
FIG. 4 is flow chart of a spin axis determination process.

Referring to all of the Figures, and more particularly to FIG. 4, as the rotating space vehicle 26 rotates about the spin axis 20, each of the lines of sight 30, 32, 34 and 48 sweep across the field of view of the sum and slit null difference antenna patterns of the dual patch antenna 10a and 10b. The GPS RF signals are received by the two patch antennas 10a and 10*b*. The hybrid 12 receives GPS signals and forms the sum and difference signals respectively received by the sum and null slit difference antenna patterns. The receiver 16 includes embedded software for processing the sum and difference GPS signals for spin axis attitude determination. The GPS sum signals are received 50 from the hybrid 12. The receiver 16 computes 52 a navigation solution from the GPS sum signals using conventional processes. The receiver 16 requires sufficient computing power to track three, four, or more GPS satellites. The computational process of the navigation solution is well known. A navigation solution is a position and velocity determination at a point in space at a point in time. The navigation solution is computed 52 from the GPS sum signals from four or preferably more received GPS sum signals from respective GPS satellites GPS1, GPS2, GPS3, and GPS4 within the field of view of the patch antenna 10*a* and 10*b*.

The receiver 16 contains computer programs with embedded algorithms for GPS signal detection, navigation solution computations, spin rate determinations and spin axis attitude determinations. The GPS receiver 16 may include an RF processor and a correlator and tracking loops, all not shown, but well-known conventional receiver components. The RF processor performs down conversion of the GPS signals for baseband processing. The resultant downconverted signal is then correlated by the correlator with an internally generated replica of the GPS satellite chipping code of the received signal. The receiver 16 controls the signal tracking loops for correlating the received GPS signals. The downconverted and correlated signals are then used to compute the navigation solution 52. The difference GPS signals are also received 54 by the receiver 16 from the hybrid 12. The difference GPS signals are used to compute for spin rate determinations and spin axis attitude determinations.

The receiver 16 performs data processing upon the received sum and difference GPS signals for respectively determining useful data segments and for determining time references. The sum and difference signals are recorded and time stamped 56 for further time correlation processing. The patch antennas 10*a* and 10*b* can receive the GPS signals when the spinning vehicle 26 is at a lower altitude than that of the GPS satellites. Lower altitude space vehicles usually have eight or more GPS satellites in view. The sum GPS signals 50 and difference GPS signals 54 are time stamped and recorded 56 with sequential data values that are cross-referenced to sequential time values. The time stamping of the received and recorded GPS signals is used for time cross-referencing for time correlation among of the recorded sum and difference GPS signals. The difference signals have slit nulls providing nulls in the GPS signals at the center plane position and hence provide a time reference within the recorded GPS signal data files. The receiver 16 includes a local time reference, not shown, that is used for time stamping. The time stamping 56 identifies the time for data in each of the data segments of the GPS signals. After time stamping the recorded GPS signals, anomaly screening, and curve fitting-processing 58 is performed on the recorded GPS signals. Anomaly screening process identifies and removes signal anomalies from the recorded GPS time stamped files. The data anomaly detection indicates false data and noise signal that are removed from time stamped recorded data GPS files. The curve fitting process is used to locate null signal at the center plane positions and hence locate the center plane positions relative to the time stamping. The carrier to noise from each visible GPS satellite is tracked as the GPS signal sweeps around with respect to the rotating vehicle. A drop off point at the center plane angle locates in time the line of sight planes from the spinning vehicle to the GPS satellites.

The null position is the center plane locations of slit nulls that is referenced in time to the recorded time stamp files. A centroid estimation process 60 is used to determine the time position of the center plane locations in the recorded GPS signals relative to each other. The nulling centroid locations are time referenced 62 to local time in the time stamped data files for time correlation. The vehicular spin rate is then determined 64 from the time referenced centroid locations. Each revolution of the vehicle 26 provides a null in the difference signals for each GPS satellite in the field of view. The time difference between two time reference centroid locations of a GPS signal provides the time of each revolution of the spinning vehicle 26 for estimating 64 the spin rate of the spinning vehicle. The spin rate estimation 64 preferably combines measurements from all of the GPS satellites in the field of view. The average spin rate for the spinning vehicle 26 may be based on recurring computations 64 of the spin rate using GPS signals from the plurality of GPS satellites. The GPS satellites are moving in predetermined orbits producing relative motion to the spinning vehicle injecting slight errors in the spin rate computation 64. A deviation of the spin rate of any one of the satellites above a threshold value may be rejected and not used during the vehicular spin rate determination 64 that can be recomputed for spin rate error minimization.

When the spin rate is accurately determined 64, the receiver 16 computes 66 the relative azimuth angles for each pair of GPS satellites. In the preferred form, four GPS satellites are used instead of only three GPS satellites. First, second, third, and fourth delta azimuth angles 42, 44, 46, and 49 between each pair of GPS satellites, GPS1 and GPS2, GPS2 and GPS3, GPS3 and GPS4, and GPS4 and GPS1, are angles on the YZ plane between respective line of sight planes defined by the line of sights 30, 32, 34, and 48, and respective first, second, third, and fourth YZ axis plane points 36, 38, 40, and 41. The respective time between two observed GPS satellites then providing respective timed centroid locations, define the projected azimuth angles 42, 44, 46, and 49 about the spin axis 20 on the YZ plane. The navigation solution and azimuth angles of the GPS satellite are used to compute 68 the spin axis attitude. The spin axis attitude could be computed 68 using GPS signals from only three GPS satellites, but potentially creating a up or down directional ambiguity along the spin axis. This up or down directional ambiguity in the solution of the spin axis attitude can be resolved using the fourth observable satellite GPS4.

The invention is directed to the formation and utilization of an electronic null slit antenna pattern for time referencing recorded GPS signals. The null slit antenna pattern and a sum antenna pattern can be created by placing two ¼ wave suitably sized antenna patches next to each other on the lateral surface of the spinning space vehicle and then attaching the antenna patches to a conventional sum and difference hybrid providing the sum and difference signals. The use of the patch antennas provides cost savings and rapid computational advantages. The conventional antenna hybrid provides both sum and difference signals of the two patch antennas with the sum and difference signals being correlated in time. The sum signal is from the sum antenna pattern for recording GPS signals. The difference signal is from the null slit difference pattern for centroid time determination. The center plane position of the null slit pattern is effectively used as a time reference for recorded GPS signals. The GPS signals are time stamped and recorded for time correlation between the GPS signals and the null slit centroid time reference. The time correlation between the null slit centroids and the recorded GPS signals enable spin rate and azimuth angle computations for the GPS satellites in the field of view. The time stamped files are used to determine azimuth angles of the observable satellites. A navigation solution and the computed azimuth angles are then used for spin axis attitude determination of the spinning space vehicle. The system and method can be used on rotational space vehicles having a constant rotational motion at an altitude below the GPS orbit with three or more GPS satellites within the field of view of the patch antennas. Those skilled in the art can make enhancements, improvements, and modifications to the invention, and these enhancements, improvements, and modifications may nonetheless fall within the spirit and scope of the following claims.

What is claimed is:

1. A method for determining the spin axis attitude of a rotating space vehicle, the space vehicle having lines of sight to GPS satellites transmitting GPS signals, the space vehicle having a navigation solution, the method comprising the step of, generating a difference antenna pattern having a center null, generating a sum antenna pattern having a center peak, receiving the GPS signals by the sum antenna pattern for providing a sum GPS signals having a peak signal at the center peak, receiving the GPS signals by the difference antenna pattern providing difference GPS signals having a null signal at center null, recording the sum GPS signals and the difference GPS signal by time, the sum GPS signals and difference GPS signals being recorded by time for time cross referencing the sum GPS signals and the difference GPS signals, determining the navigation solution of the rotating space vehicle from the sum GPS signals, determining respective centroid locations in the difference signals, determining azimuth angles between the GPS satellites and the space vehicle from the centroid locations and the sum GPS signals, and determining the spin axis attitude of the space vehicle from the azimuth angles and the predetermined navigation solution.

2. The method of claim 1, further comprising the step of computing a spin rate of the space vehicle from the centroid locations.

3. The method of claim 1 wherein, the space vehicle is a cylindrical satellite in an orbit lower than orbits of the GPS satellites.

4. The method of claim 1 wherein, the difference signals are three difference GPS signals.

5. The method of claim 1 wherein, the GPS satellites are four GPS satellites, and the difference GPS signals are four difference GPS signals.

6. The method of claim 1 wherein, the difference signals for the respective GPS signals of the respective GPS satellites have a null value when the center plane position of the difference pattern is aligned with a respective one of the lines of the sights to the GPS satellites.

7. The method of claim 1 wherein, the navigation solution is determined from four of the GPS signals, and the spin axis attitude is determined from three of the GPS signals.

8. A method for determining the spin axis attitude of a rotating space vehicle defined in space by an X axis, Y axis, and Z axis, the X axis is along the spin axis attitude, the space vehicle having a line of sight to three or more GPS satellites transmitting GPS signals, the method comprising the step of, generating a sum antenna pattern and a difference antenna pattern for providing sum GPS signals and difference GPS signals from the GPS signals, receiving the sum GPS signals and the difference GPS signals, the sum GPS signals have a center peak in a center plane position and the difference GPS signals having a null at a center plane position, computing a navigation solution from the sum signals for providing a location in space of the space vehicle, time stamping the received sum GPS signals and the received difference GPS signals, determining respective centroid locations in the time stamped recorded difference signals, determining azimuth angles between the GPS satellites relative to a yz plane from the centroid locations, and determining the spin axis attitude of the space vehicle from the azimuth angles and the navigation solution.

9. The method of claim 8 further comprising the step of, spin rate determining the spin rate of the rotating vehicle from time displacements between the centroid locations.

10. The method of claim 8 wherein, the sum signals for the respective GPS signals of the respective GPS satellites have a peak value when the center plane position of the sum pattern is aligned with a respective one of the lines of the sights to the GPS satellites, and the difference signals for the respective GPS signals of the respective GPS satellites have a null value when the center plane position of the difference pattern is aligned with a respective one of the lines of the sights to the GPS satellites.

11. A method for determining the spin axis attitude of a rotating space vehicle defined in space by an X axis, Y axis, and Z axis, the X axis along the spin axis attitude, the space vehicle having lines of sight to three or more CPS satellites transmitting CPS signals, the method comprising the step of, generating a sum antenna pattern and a difference antenna pattern for providing sum CPS signals and difference GPS signals from the CPS signals, receiving the sum CPS signals and the difference CPS signals, the sum CPS signals have a center peak in a center plane position and the difference CPS signals having a null at a center plane position, computing a navigation solution from the sum signals for providing a location in space of the space vehicle, time stamping the received sum GPS signals and the received difference CPS signals, determining respective centroid locations in the time stamped recorded difference signals, determining the spin rate of the rotating vehicle from time displacements between the centroid locations, determining azimuth angles between the CPS satellites relative to a zy plane from the centroid locations, and determining the spin axis attitude of the space vehicle from the azimuth angles and the navigation solution.

12. The method of claim 11 wherein, the GPS satellites are three GPS satellites, the sum signals are three GPS sum signals, the difference signals are three GPS difference signals.

13. The method of claim 11 wherein, the GPS satellites are four GPS satellites, the sum signals are four GPS sum signals, and the difference signals are four GPS difference signals.

14. The method of claim 13, wherein, the sum signals for the respective GPS signals of the respective GPS satellites have a peak value when the center plane position of the sum pattern is aligned with a respective one of the lines of the sights to the GPS satellites, and the difference signals for the respective GPS signals of the respective GPS satellites have a null value when the center plane position of the difference pattern is aligned with a respective one of the lines of the sights to the GPS satellites.

* * * * *